(12) United States Patent  
Burke et al.

(10) Patent No.: US 8,733,860 B1  
(45) Date of Patent: May 27, 2014

(54) STORAGE SYSTEM AND METHOD

(75) Inventors: Thomas J. Burke, Whitehouse Station, NJ (US); Ross Marrone, Cranford, NJ (US); John Skurzynski, Rahway, NJ (US)

(73) Assignee: Thomas J. Burke, Whitehall Station, NJ (US)

( * ) Notice: Subject to any disclaimer, the term of this patent is extended or adjusted under 35 U.S.C. 154(b) by 0 days.

(21) Appl. No.: 13/385,855

(22) Filed: Mar. 12, 2012

(51) Int. Cl.
| | |
|---|---|
| A47B 49/00 | (2006.01) |
| A47B 77/16 | (2006.01) |
| A47F 3/08 | (2006.01) |
| A47F 5/00 | (2006.01) |
| A47F 1/00 | (2006.01) |
| B65G 15/00 | (2006.01) |
| B65G 17/00 | (2006.01) |
| B65G 19/00 | (2006.01) |

(52) U.S. Cl.
USPC ............................. 312/268; 312/97; 312/134

(58) Field of Classification Search
USPC ............ 312/97, 134, 266–268; 221/119, 121, 221/122; 198/797, 798, 799, 710, 711, 712; 187/250, 255
See application file for complete search history.

(56) References Cited

U.S. PATENT DOCUMENTS

| | | | | |
|---|---|---|---|---|
| 617,965 | A * | 1/1899 | Lippincott et al. | 108/102 |
| 2,370,546 | A * | 2/1945 | Kiesling | 198/798 |
| 3,172,527 | A * | 3/1965 | Swartz et al. | 312/36 |
| 3,197,045 | A * | 7/1965 | Nevo-Hacohen | 414/248 |
| 3,199,658 | A * | 8/1965 | Graber et al. | 211/121 |
| 4,178,048 | A * | 12/1979 | Zippel | 312/267 |
| 4,821,887 | A * | 4/1989 | Iemura et al. | 211/1.56 |
| 4,942,290 | A * | 7/1990 | Frerking | 235/381 |
| 4,944,387 | A * | 7/1990 | Burke | 198/706 |
| 4,957,188 | A * | 9/1990 | Bavis | 186/41 |
| 5,407,264 | A * | 4/1995 | Giegerich et al. | 312/268 |
| 5,431,493 | A * | 7/1995 | Larson | 312/268 |
| 5,884,752 | A * | 3/1999 | Osborn et al. | 198/706 |
| 6,854,815 | B1 * | 2/2005 | Smith | 312/268 |
| 7,278,532 | B2 * | 10/2007 | Martin | 198/800 |
| 7,743,930 | B2 * | 6/2010 | Krohn | 211/1.51 |
| 7,837,424 | B2 * | 11/2010 | Solomon | 414/331.04 |

FOREIGN PATENT DOCUMENTS

| | | | | | |
|---|---|---|---|---|---|
| DE | 3825401 | A1 * | 1/1990 | | B65G 1/12 |
| GB | 2002724 | A * | 2/1979 | | B65G 1/12 |
| JP | 55101503 | A * | 8/1980 | | B65G 17/48 |

* cited by examiner

*Primary Examiner* — Janet M Wilkens  
*Assistant Examiner* — Andrew Roersma  
(74) *Attorney, Agent, or Firm* — Joanne M. Martin

(57) ABSTRACT

A storage system comprising a plurality of shelf units movable together through a circuit attached to and moved by a flexible drive such as a chain or belt, while being guided and stabilized in orientation by a separate guide track which track followers, retained by each shelf unit, move to maintain a selected orientation of the shelves within a system support or enclosure. Each shelf unit is removable by the user from engagement of the drive and from the system enclosure permitting replacement of the shelves within the storage system without system disassembly.

14 Claims, 8 Drawing Sheets

STORAGE SYSTEM AND METHOD

FIELD OF THE INVENTION

The present invention relates to movable container storage systems and in particular, to vertically movable shelf storage systems and methods.

BACKGROUND OF THE INVENTION

Frequently, loose, single, unrelated and/or random items, as well as multiple units of similar items are not stored in a container of similar units, but grouped together in an external storage unit, e.g. a shelf, box, etc. not specifically associated with any one such item to be stored. However, shelves as may be associated with furniture or even storage cabinets, e.g. filing cabinets, become filled requiring more units to adequately store the material, and finding the desired item becomes hard to manage among many similar units spread over a large floor area.

In many environments whether home or commercial, the loading of such shelves may vary for each system and for each shelf within a particular system. Moreover, the distribution of load within each shelf is completely arbitrary and top heavy or a high center of gravity may occur, and as a result, gravity cannot be used to define shelf orientation. The shelf system structure and operation must necessarily be easy to operate, agile in handling varying loads, and reliable.

Additionally, replacement of shelves with other or custom shelves may be necessary according to the users requirements, without disassembly of the storage system or unaffected shelves.

SUMMARY

The storage system according to the present invention comprises a plurality of shelf units movable together through a circuit attached to and moved by a flexible drive such as a chain or belt, while being guided and stabilized in orientation by a separate guide track which track followers, retained by each shelf unit, move to maintain a selected orientation of the shelves within a system support or enclosure. Each shelf unit is removable by the user from engagement of the drive and from the system enclosure permitting replacement of an individually selected shelf within the storage system without system disassembly.

BRIEF DESCRIPTION OF THE DRAWING

These and further features according to the present invention will be better understood by reading the following Detailed Description, taken together with the following figures, wherein.

DETAILED DESCRIPTION

Figure 1:
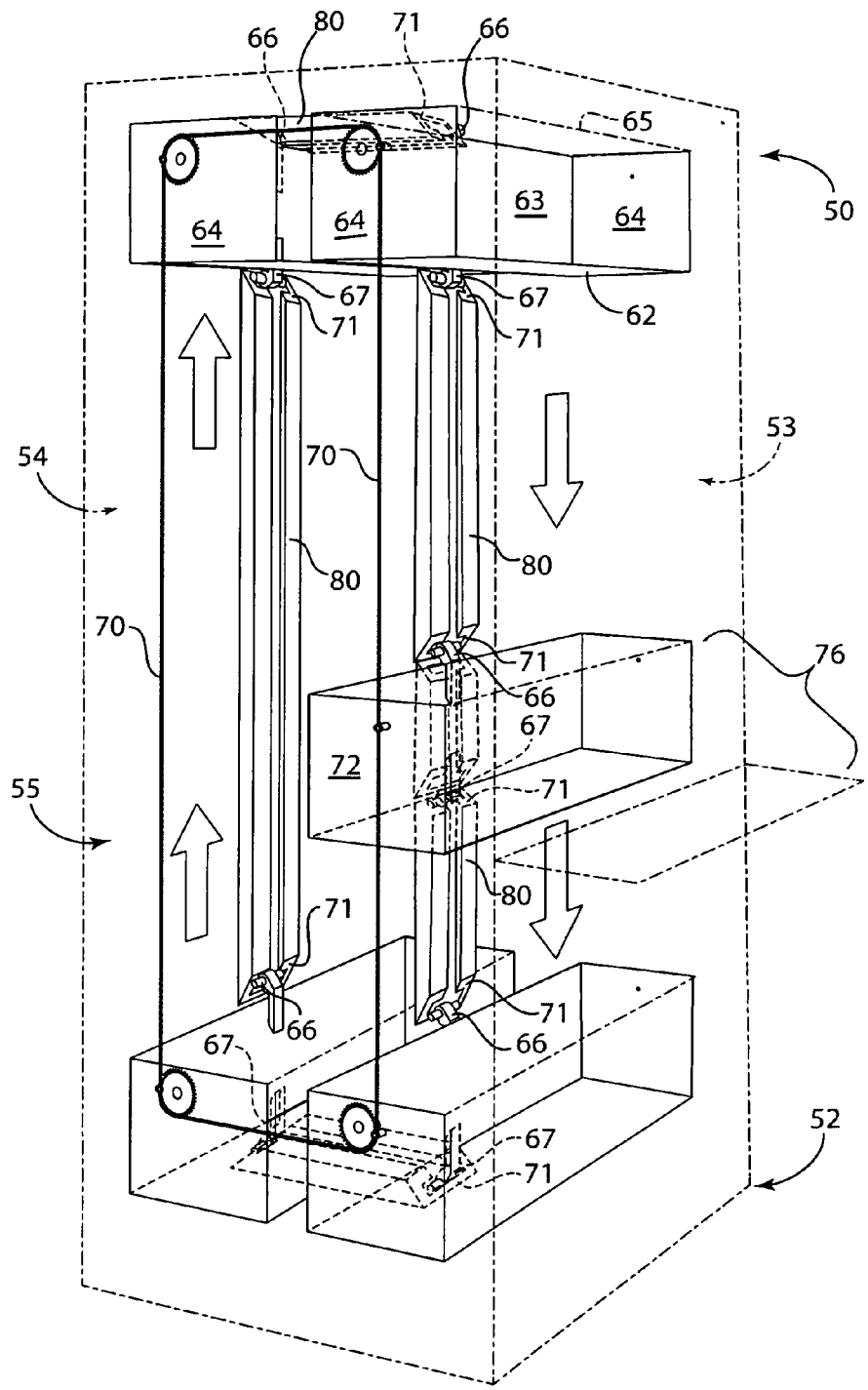
FIG. 1 is a perspective view of an exemplary storage system according to the present invention showing the shelf units connected to separate drive and guide elements within an enclosure.

A simplified perspective view 50 of one embodiment according to the present invention is shown in FIG. 1, comprising an enclosure or housing 52 having a front 53 and a rear 54 and oppositely facing sides 55, and 56 (not shown) connecting the enclosure front 53 and rear 54. The exemplary enclosure 52 shown is generally greater in height (Z direction) than depth (Y direction) or width (X direction), but is not limited to such proportions. Included in the enclosure 52 are several shelves 60A, 60B, etc., connected at a corresponding end to at least one drive belt or chain 70 at intervals thereaulong. Typically, a second drive belt or chain is provided on the other side of the shelves and correspondingly connected to each facing shelf side. The drive belt or chain 70 is movable in a closed circuit generally resembling a rectangle, but other circuit shapes may be provided according to the present invention. Typically the dimensions of the enclosure, the dimensions of the shelves and the number of shelves may be selected, and the dimensions of the corresponding tracks, belts, enclosure dimensions will be determined according to the present invention. Alternately, the available dimensions (or other parameter(s)) may be first selected and the remaining system parameters according to the present invention later determined.

The exemplary embodiment 50 moves the shelf units 60A, 60B, etc. about the chosen circuit by motion applied to the drive belt or chain 70 by a drive motor and connecting belt or chain (110 and 109 respectively, FIG. 2A) operable to move the shelf units in either direction about the circuit and optionally at a selected rate.

According to the present invention, the shelf units 60A, 60B, etc. have a desired position as they travel the circuit as provided by a track 80 separate from the suspension members and motion forces. Each shelf unit 60A, 60B, etc. typically includes a generally planar bottom 62 and opposing sides 64 (which engage the belt or chain 70), a rear 63 substantially upright from the base 62 and connected to each side 64, and an optional to 65 generally facing the base 62 and connected to the sides 64, and further includes a track follower member 66 near or at the upper extreme of the rear 64 and a track follower member 67 at or near the lower extreme of the rear 63, each of which is disposed between sides 64 as viewed from the enclosure front and engage a region of the track 80. As further described in detail below, the track is also disposed between sides 64 as viewed from the enclosure front and selectively provides limited motion in 2 directions, e.g. the depth (Y) and width (X) direction, while permitting motion in the Z direction to accommodate the circuit defined by the belt or chain 70. After being disconnected from the drive belt or chain 70 by removal of connecting supports 72, discussed further below, a shelf may be removed and replaced at the end of a guide track section where the followers 66, 67 may exit or enter. The guide track 80 further includes apertures to permit the track followers 66, 67, substantially vertically aligned in this embodiment, to exit the track 80 during motions during change in direction of the shelf in the circuit, or to allow removal of the shelf from the circuit at a selected position along the circuit, e.g. a shelf loading station 76 located at height convenient to the user.

Figure 2A:
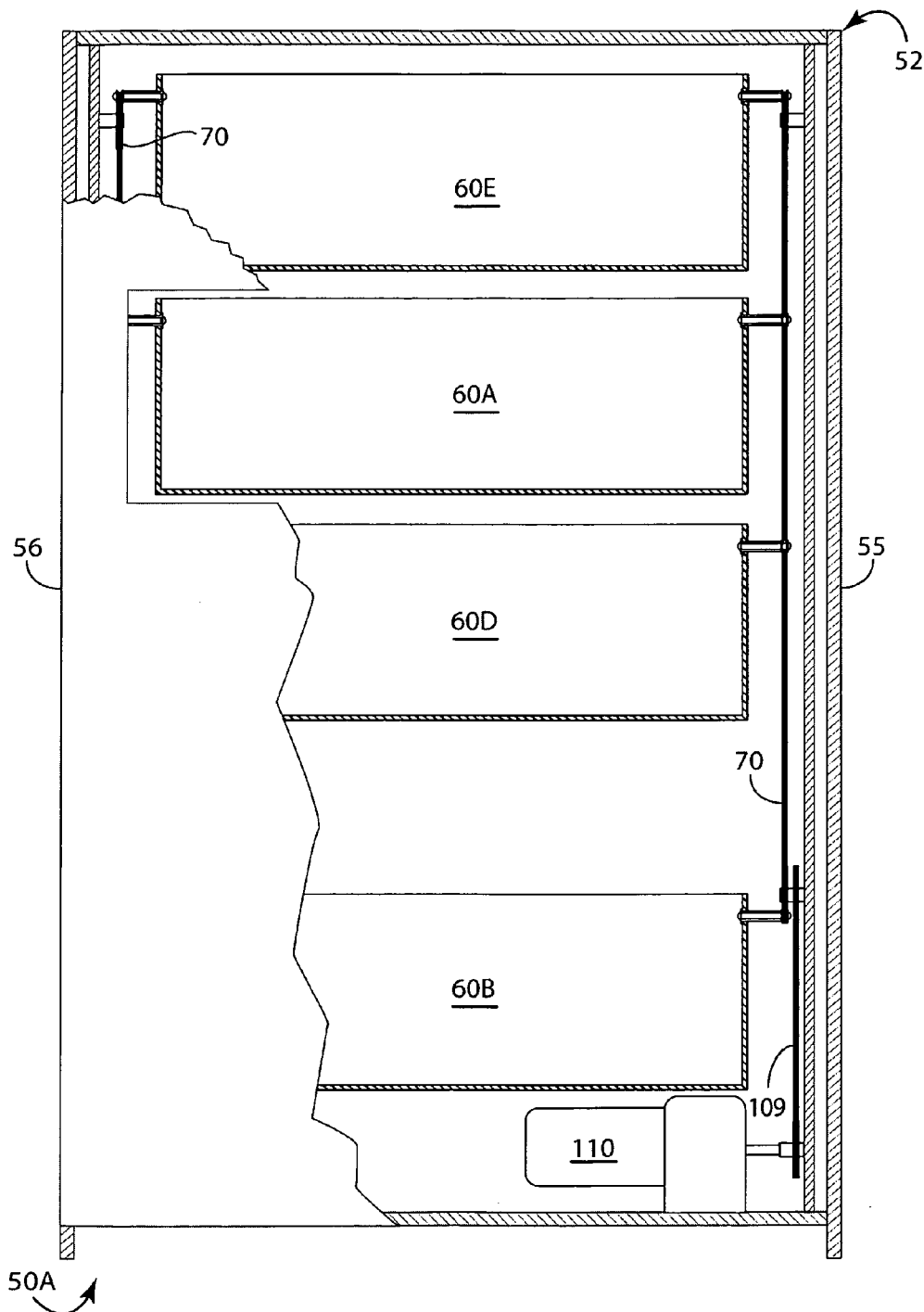
FIG. 2A is a front elevation view of the storage system of FIG. 1 showing shelf units, drive members and enclosure.
Figure 2B:
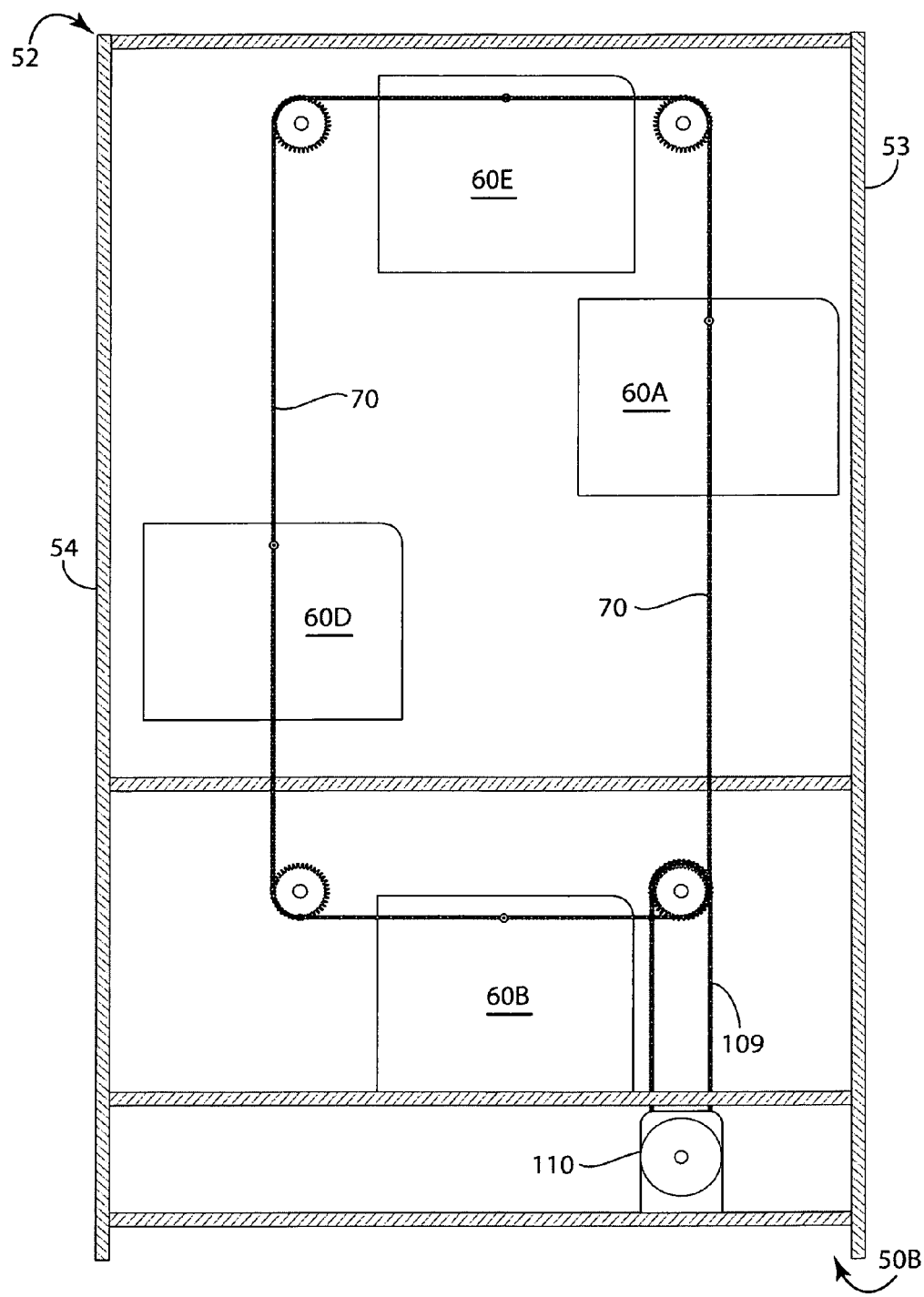
FIG. 2B is a side elevation view of the storage system of FIG. 1 showing shelf units, drive members and enclosure.
Figure 3:
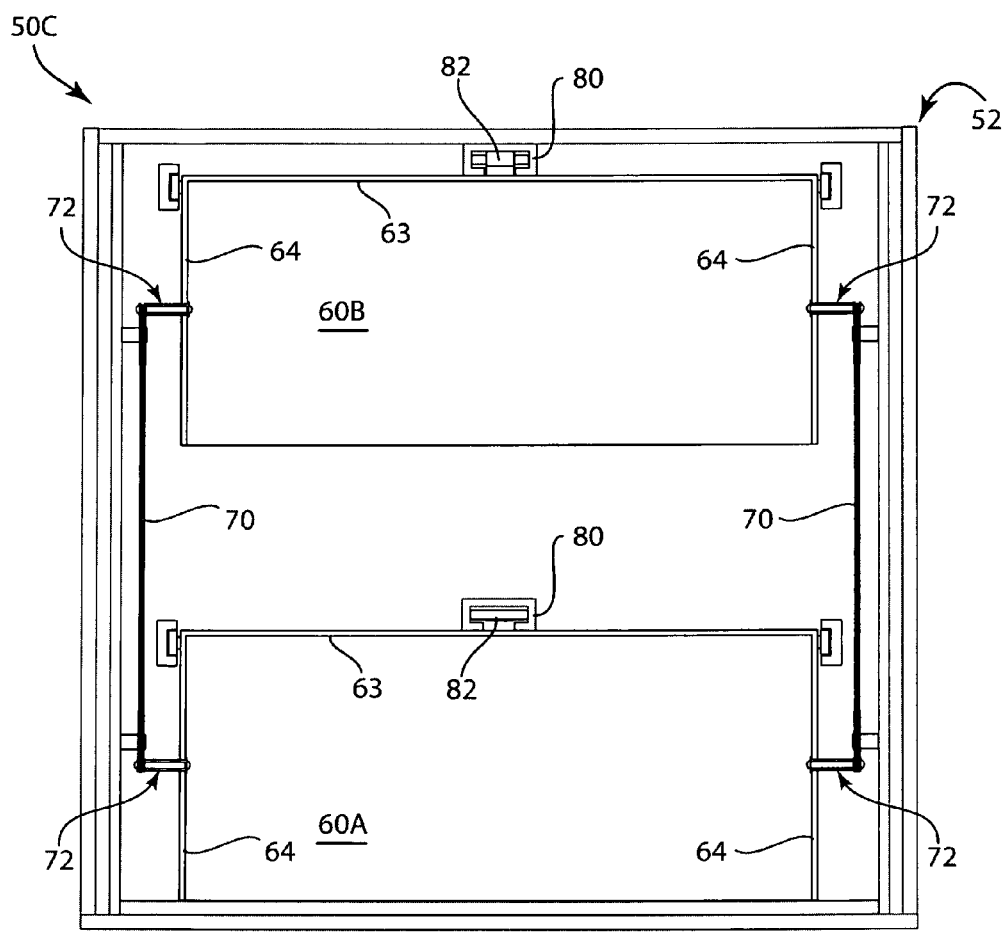
FIG. 3 is a plan view of the storage system of FIG. 1 showing shelf units, drive members, guide members and enclosure.

Front and side elevation views 50A and 50B are shown in FIGS. 2A and 2B, respectively. The drive motor 110 and connecting belt or chain 109 engages the shelf drive chain or belt 70 typically with a common gear or pulley along the circuit of the chain or belt 70, or may alternately engage the drive belt or chain as desired to transfer motion thereto. The enclosure 52 includes the shelf units 60A, 60B, 60D, 60E as attached along the drive belt or chain 70. A top view 50C of the exemplary system is shown in FIG. 3, wherein the shelf units 60A, 60B are shown connected to and spaced apart from the drive chain or belt 70 by connecting supports 72. Furthermore, the shelf units engage portions of the guide track 80 by followers 82 attached to the rear 63 of each shelf unit 60A, 60B so that the position and orientation of each shelf unit 60A, 60B, etc., is provided by a combination of the shelf connection to the drive chain or belt by supports 72 and by followers 82 within the respective portion of the guide track 80.

Figure 4:
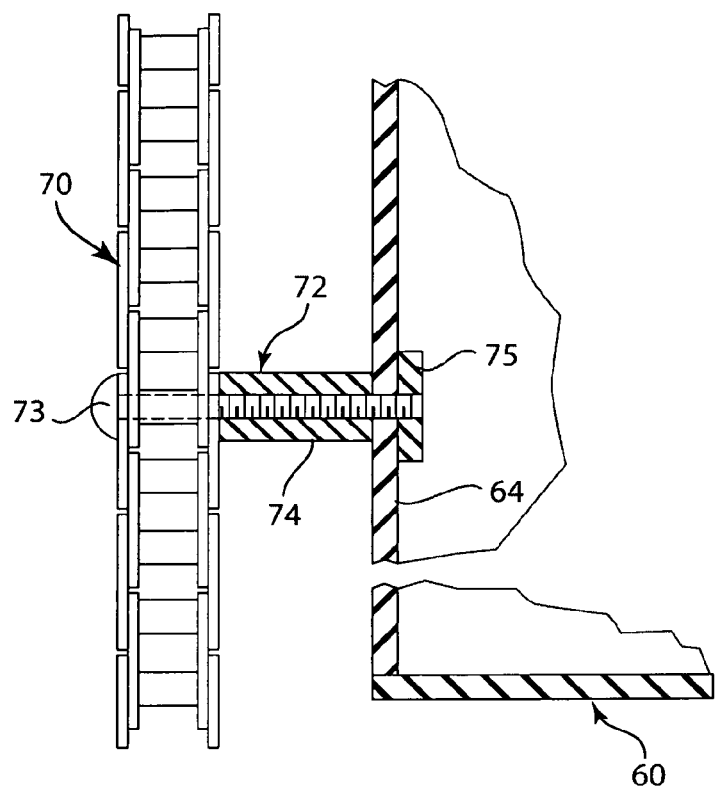
FIG. 4 is a detailed partial elevation view of a shelf unit, drive member and removable shelf retaining member.

The removable connection of a typical shelf unit 60 to the drive chain or belt 70 is shown in FIG. 4, wherein a threaded member 73, e.g. a bolt or screw, passes through the drive belt or chain 70 generally perpendicular to the direction of travel along the belt or chain 70 circuit and receives a mating threaded member extending through a hole in a side 64 of the exemplary shelf unit 60. Moreover, the mating threaded member 74 has an region 75 of diameter larger than the region passing through the shelf unit 60 wall 64 to retain the shelf unit 60 to the drive belt or chain while permitting the shelf unit 60 freedom to rotatably pivot thereon as the point of connection with the drive chain or belt traverses the circuit. Furthermore, the shelf unit 60 is selectively removable by the user by unscrewing the mating threaded member 74 from the threaded member 73 and moving the shelf from the guide track through corresponding openings (71, FIG. 1) in the guide track.

Figure 5:
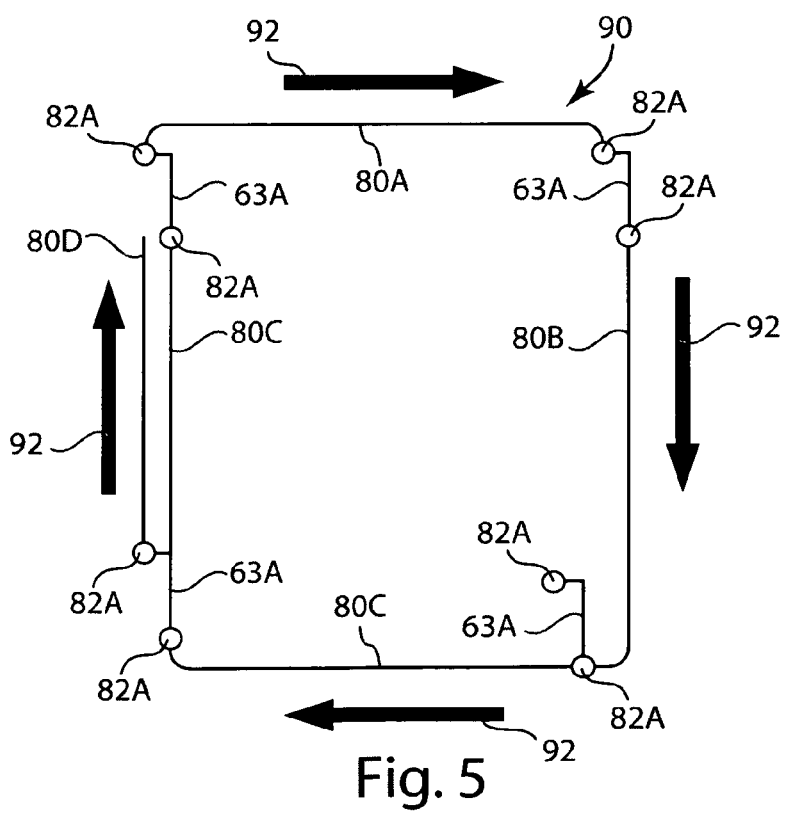
FIG. 5 is a schematic drawing of an exemplary circuit of shelf unit motion of the embodiment of FIG. 1.

An embodiment 90 of a circuit of shelf movement and the corresponding guide track segments 80A, 80B, 80C and 80D and followers 82A connected to elements 63A of individual shelf units are shown in FIG. 5, wherein the track segments, e.g. 80A and 80A may be offset in path alignment to accommodate a corresponding offset in follower location relative to the shelf unit element 63A. In the embodiment 90 of FIG. 5, multiple track segments, e.g. 80C and 80D, may run parallel for at least a portion of the circuit 92.

Figure 6A:
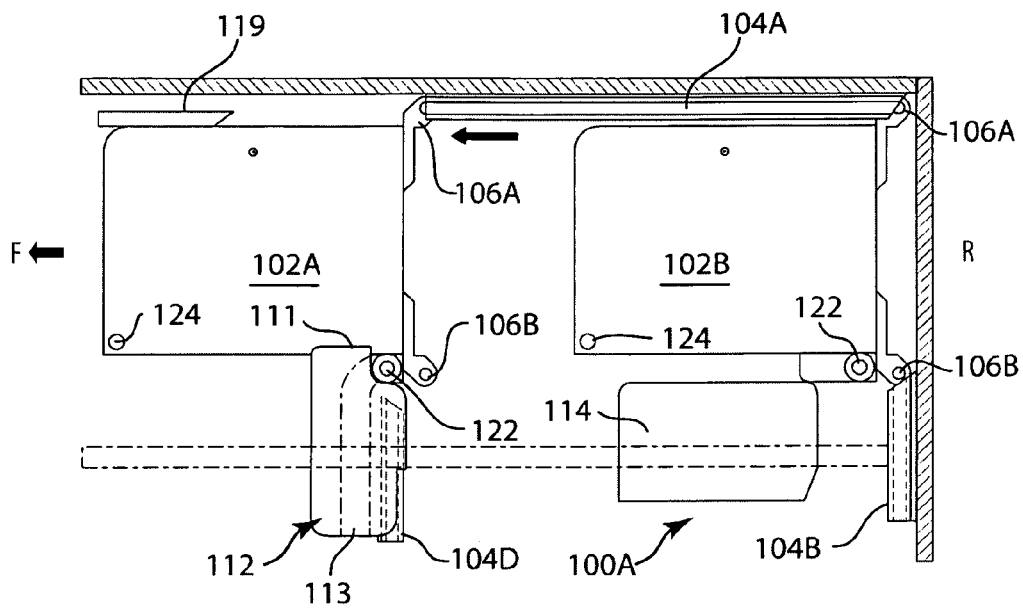
FIG. 6A is an elevation view of an exemplary bottom portion of a shelf unit guide members of the storage system of FIG. 1.
Figure 6B:
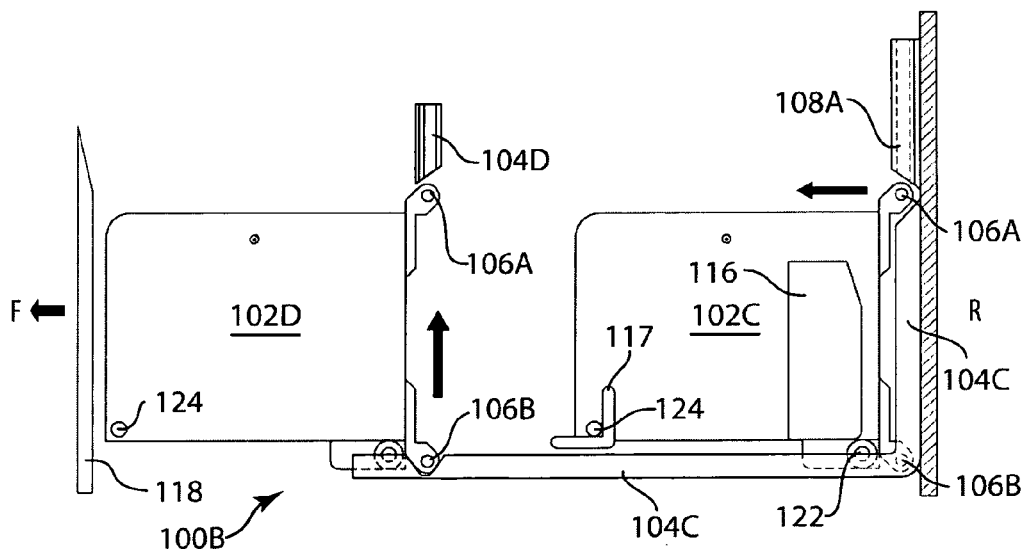
FIG. 6B is an elevation view of ann exemplary upper portion of a shelf unit guide members of the storage system of FIG. 1.

Further detailed side views 100A and 100B the upper and lower regions of an exemplary embodiment of the present invention are shown in FIGS. 6A and 6B, respectively, each having the front F and rear R regions indicated thereon, wherein exemplary shelf units 102A, 102B, 102C and 102D travel along a circuit defined by a drive belt or chain (not shown) and stabilized in orientation by shelf unit followers 106 received in exemplary guide track segments 104A, 104B, 104C and 104D which may be discrete sections or contiguous with apertures 108 permitting movement of shelf unit followers out of the channel of the guide track segment(s). Additionally, optional guide blocks 112, 114, 116, 118 and 119 which engage members attached to the shelf units 102A . . . 102D to provide further stability during corner transits where the direction of the shelf units change between vertical and horizontal. Guide pins 122 goes into the channel 113 of the guide block 112, after which follower 106B enters guide track section 104D as the shelf 102A goes down. Lower follower 106B enters guide track section 104A. The guide pin 122 rides the outer edge of guide block 114 as the shelf unit 102B travels around the corner. The guide block 116 allows the guide pin 122 to pass around as the shelf goes through the corner. Additional front guide pin 124 rides the upper surface 111 of guide block 112 as the shelf unit 102A moves horizontally, and against guide 117 in FIG. 6B. In FIG. 6B, the vertical portion of the guide track 104C via an aperture 108A. When the shelf 102D motions become vertical, the upper follower 106A enters the guide track 104D while the lower follower exits the guide track 104C horizontal portion 104C via an aperture (or end) 108B. The order of the above described shelf, follower and guide pin motions may be reversed with a reversal of drive belt or chain (70) motion.

Figure 7A:
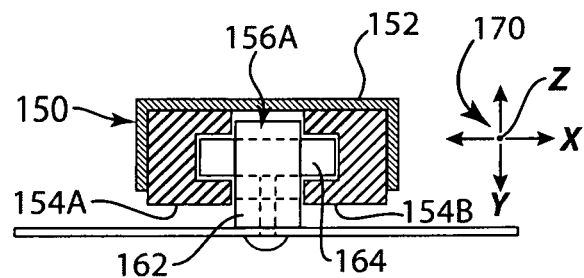
FIG. 7A is a more detailed partial plan view of exemplary guide members of the storage system of FIG. 1.
Figure 7B:
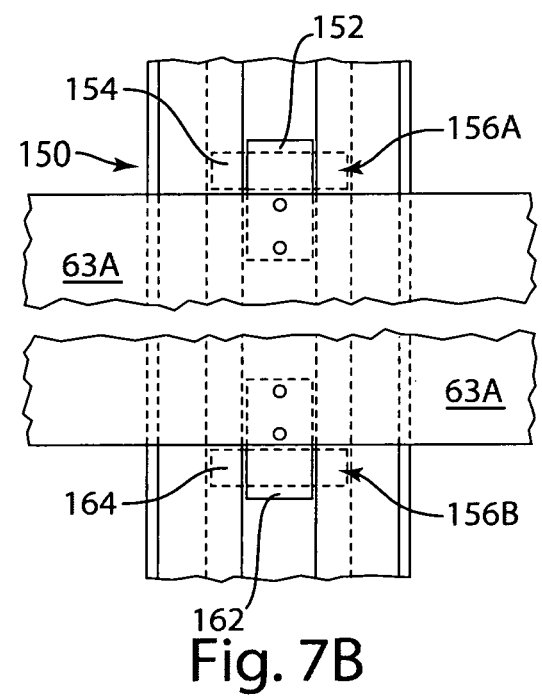
FIG. 7B is a more detailed partial elevation view of exemplary guide members of the embodiment of FIG. 1.
Figure 8:
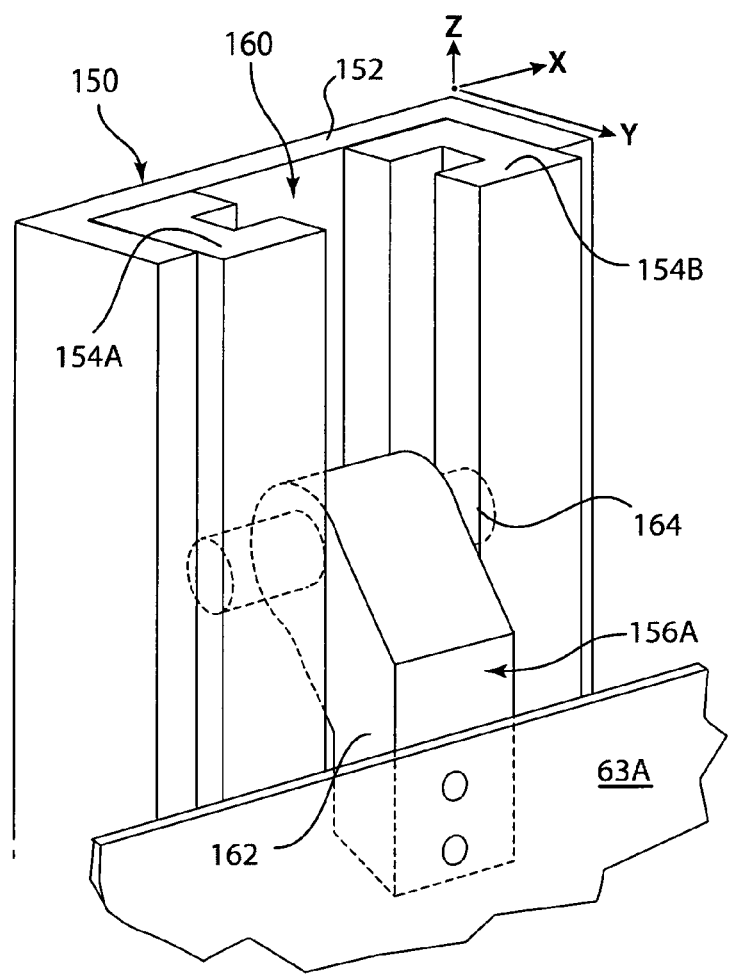
FIG. 8 is a perspective view of the engagement members of FIGS. 7A and 7B.

Detailed top and elevation views of shelf unit followers engaging corresponding channels in a track portion are shown in FIGS. 7A and 7B, with the axis orientation label 170 indicating the Z-axis extends out of the plane of FIG. 7A. A perspective view is shown in FIG. 8. A guide track 150 comprises a flat metal strip, aluminum U-channel 152 or equivalent, including inner spaced and opposing plastic U-channels 154A and 154B forming a channel (i.e. 160, FIG. 8) into which upper and lower followers 156A and 156B are received. The followers 156A and 156B typically comprise an arm 162 holding a perpendicular pin 164 spaced apart from the shelf unit both from the rear extreme or surface (e.g. 63A) of the shelf unit and away from the upper and lower planes, respectively, or maximum dimensions to allow the pin 164 to engage the channel 160 without obstruction from the elements or body of the shelf units. However, in embodiments where a follower engages only a horizontal guide track, that follower need be spaced only from the extreme vertical shelf dimension, and a follower that engages only a vertical guide track need only be spaced from the extreme horizontal shelf dimension.

Further modifications and substitutions made by one of ordinary skill in the art are within the scope of the present invention which is not limited except by the claims which follow.

What is claimed is:

1. A storage system, comprising:
   an enclosure including a front portion;
   one or more shelves movable in 2 axes within said enclosure, one of said 2 axes being a vertical axis, said enclosure and having a rear portion, two opposing side portions separated by said rear portion, and a substantially planar member between at least 2 of said portions;
   a continuous suspension having 2 members each retained within said enclosure, and connected to a corresponding one of said side portions, said continuous suspension defining a circuit of motion within said enclosure and retaining said shelf therealong; and
   a stabilizing guide engaging said enclosure and said shelf behind said rear shelf portion as viewed from said front portion and between said two opposing side portions and spaced away from said continuous suspension members, wherein
      said stabilizing guide comprises a track interrupted by apertures therealong, and disposed in a guide circuit substantially parallel to said circuit of motion,
      each said shelf includes an upper and a lower connecting member thereon received into said stabilizing guide behind said shelf rear portion and between said two opposing side portions, as viewed from said front portion, and in a non-rotating relationship with said shelf rear portion, and is removable from said stabilizing guide via said aperture, and wherein said stabilizing guide together with said upper and said lower connecting members provide a selected orientation of said shelf within said enclosure over said circuit of motion.

2. The storage system of claim 1, wherein said stabilizing guide includes a first portion to engage said shelf upper connecting member and a second portion to engage said shelf lower connecting member.

3. The storage system of claim 2, wherein said stabilizing guide further includes a third portion to engage both said shelf upper connecting member and said shelf lower connecting member.

4. The storage system of claim 1, wherein said stabilizing guide includes vertically offset regions.

5. The storage system of claim 4, wherein said vertically offset regions each engage a different one of said shelf upper connecting member and said shelf lower connecting member.

6. The storage system of claim 1, wherein said continuous suspension includes shelf engaging pins.

7. The storage system of claim 6, wherein said shelf engaging pins each include threaded portions and a removable nut engaging a corresponding said threaded portion.

8. The storage system of claim 1, wherein at least one shelf is removable from said enclosure while retaining said upper connecting member and said lower connecting member.

9. The storage system of claim 1, wherein said continuous suspension provides horizontal shelf motion and a vertical shelf motion over a distance greater than said horizontal shelf motion.

10. The storage system of claim 1, wherein said circuit of motion is movable in a selectable one of two opposing directions.

11. The storage system of claim 1, wherein said enclosure includes a guide block disposed to selectively limit motion of said shelves outside said circuit of motion.

12. The storage system of claim 11, wherein said guide block is proximal a shelf side.

13. The storage system of claim 12 wherein said shelf side includes a guide pin to engage an edge of said guide block.

14. The storage system of claim 1, further includes a motor connected to said continuous suspension to provide movement of said shelves over said circuit of motion.

* * * * *